Jan. 25, 1949.　　　M. E. MARTELLOTTI　　　2,459,825
BEARING
Filed May 24, 1941　　　　　　　　　　　　　2 Sheets-Sheet 1
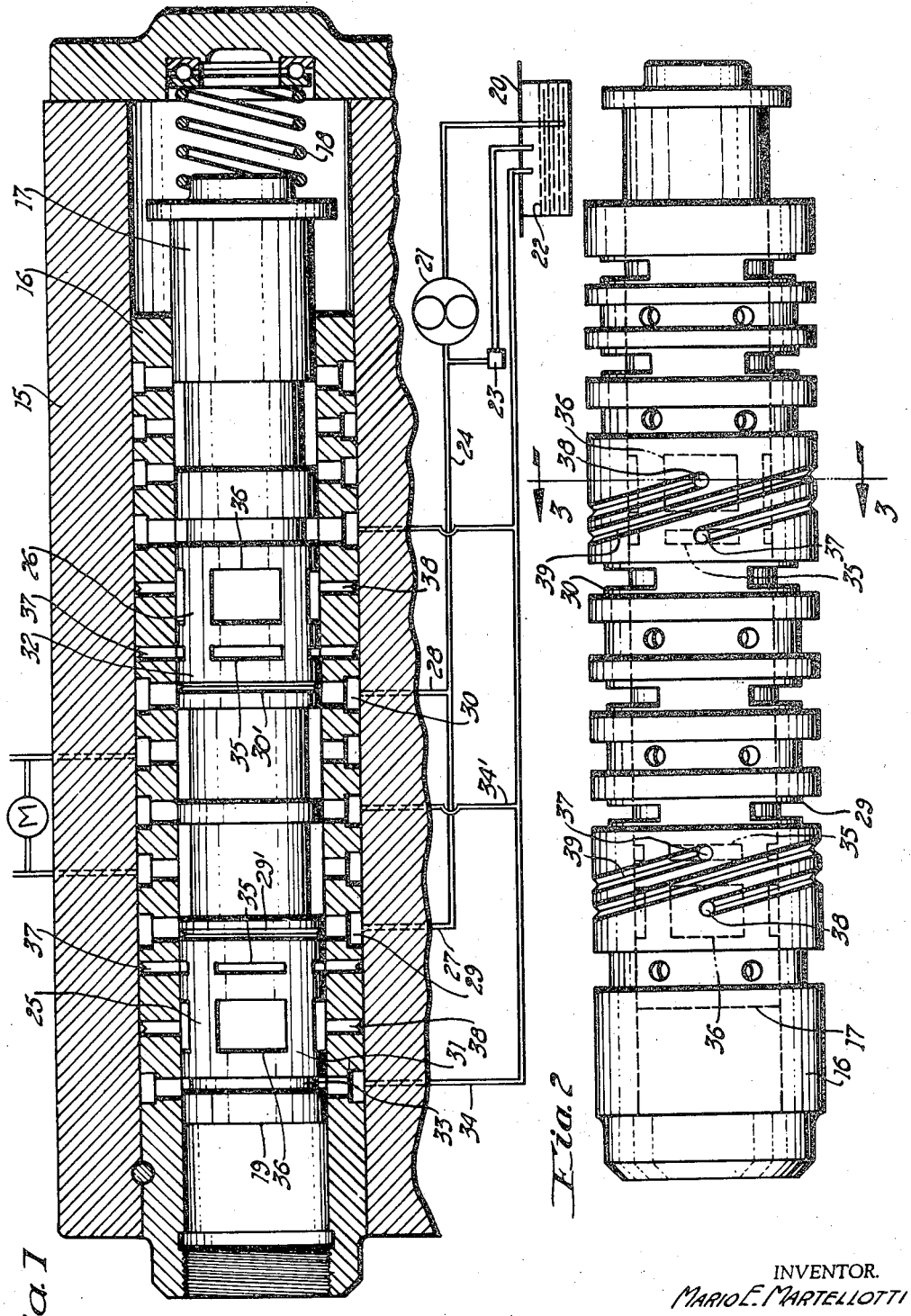
INVENTOR.
MARIO E. MARTELLOTTI
BY
A. K. Parsons
ATTORNEY.

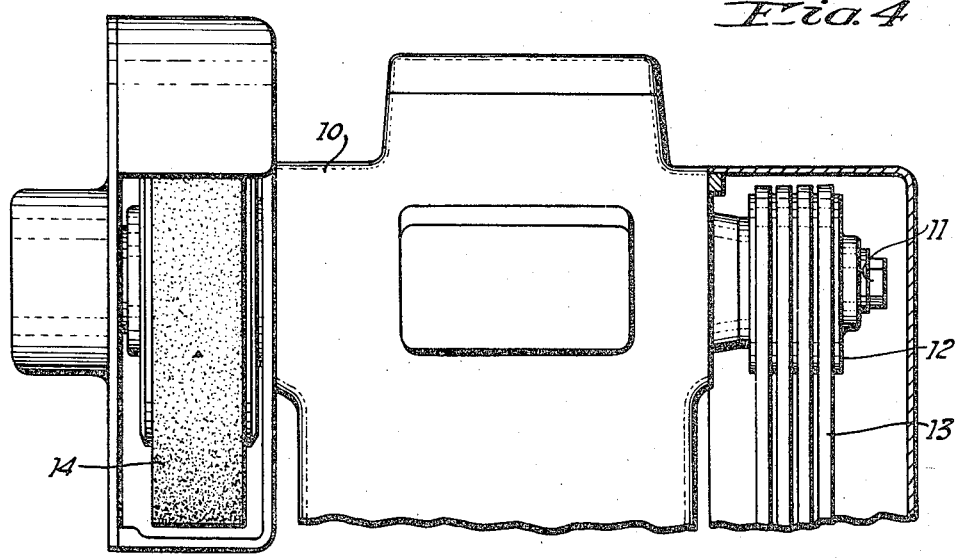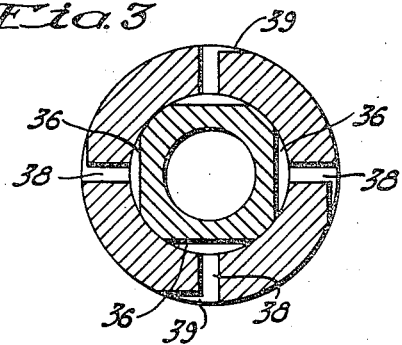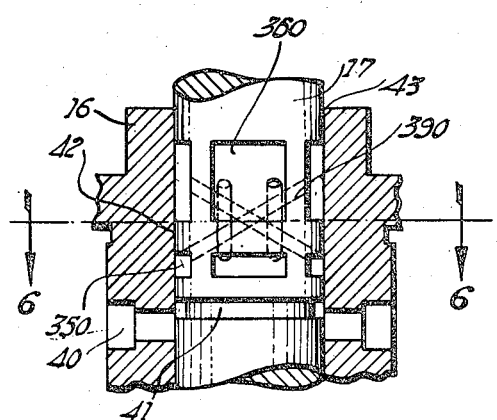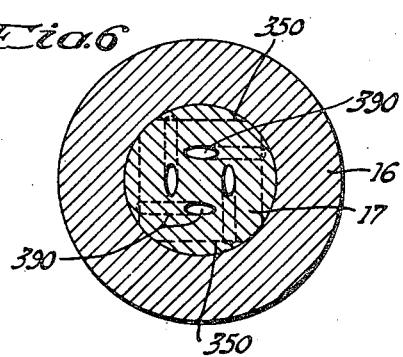

Patented Jan. 25, 1949

2,459,825

UNITED STATES PATENT OFFICE 2,459,825

BEARING

Mario E. Martellotti, Cincinnati, Ohio, assignor to The Cincinnati Milling Machine Company, Cincinnati, Ohio Application May 24, 1941, Serial No. 395,086

26 Claims. (Cl. 308—122)

This invention relates to improvements in bearings and has particular reference to a bearing of what is commonly known as the plain or journal type as distinguished from anti-friction bearings employing balls, rollers or like interpolated mechanical devices.

Bearings of this character have been found particularly advantageous for use for precision purposes where either rotation, relative axial sliding or combinations of these movements will be effected in that a close accurate fit of the parts may be attained and the same are not subject to the vibrations frequently attendant upon what are commercially known as anti-friction bearings such as above referred to.

Basically, such bearings ordinarily comprise an outer box, sleeve or support having a cylindrical bore and a member mounted therein in telescoping, interfitting relation with the bore.

One of the objects of the present invention is the provision in a structure of this general character of means which shall be effective to insure adequate lubrication of the interfitting surface of these parts and maximum opposition to their relative displacement in a radial direction.

Another object of the present invention is the provision of a structure which will insure extreme freedom of motion of the member in an axial direction with respect to the bore.

A further object of the present invention is the provision of a pressure lubricated bearing structure of the character above referred to which shall embody means for so directing the pressure lubricant as to resist radial relative displacement of the parts under directionally varying loads.

An additional object of the present invention is the provision of a structure which will adequately maintain a circumscribing film of oil intervening the interfitting surfaces irrespective of such directional loads and thus insure free relative rotary or sliding movements of the parts when in use and prevent binding, canting or other movement tending to produce undue frictional resistance or metal to metal contact.

A further object of the present invention is the provision in connection with a pressure lubricated bearing structure of means responsive to directional loadings of one of the bearing elements for automatically modifying the pressure reactions of the lubricant with respect to different portions of the bearing adequately to compensate for the loading of the element, and which will be equally effective whether the parts are in motion or at rest and whether the load is externally applied or is merely that of the weight of the supported element which in ordinary bearings tends to settle down into a metal to metal contact condition when at rest.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Figure 1 is a semi-diagrammatic view partly in section of the present invention applied to increase and maintain the sensitivity of a floating valve member.

Figure 2 is a view in elevation of the sleeve or bushing portion of said valve member.

Figure 3 is a sectional view on the line 3—3 of Figure 3.

Figure 4 is a fragmentary view of a grinding wheel head in which the present invention may be utilized as a bearing for the grinding wheel spindle.

Figure 5 is a fragmentary sectional view of an alternative form of the present invention utilizable in connection with the structures of Figure 1 or Figure 4, and Figure 6 is a sectional view on the line 6—6 of Figure 5.

In the drawings the numeral 15 designates a suitable supporting element for a ported sleeve or bushing 16 in which is mounted a spindle or valve member 17. This latter has been shown as a valve having a capacity for both rotary movement and longitudinal or axial movement, being urged in one axial direction with respect to the bushing 16 as by the spring 18, the additional desired movement or movements being imparted to the spindle 17 by application of suitable mechanical forces as at 19.

In Figure 2 the member 16 has been illustrated in elevation, while in Figure 1 it is shown in section with the contained member 17 in elevation. It will be noted that the essential elements comprise the inner cylindrical member 17 suitably mounted in interfitting relation to a supporting element 16 in telescoping interfitting relation therewith as is customary in what is commercially known as plain as distinguished from ball, roller or other antifriction types of bearings.

In a bearing of this character there is ordinarily provided a few thousandths clearance between the parts to establish what is known as a running fit so that they may be readily shifted by sliding, rotation or otherwise. To prevent metal to metal contact of the parts it is customary that lubricant be suitably supplied designedly to create an oil film intervening the parts and preventing their metal to metal contact. Such contact results in high friction or resistance to movement, and may cause seizing of the parts, scoring or the like.

In carrying out the present invention there has been provided a suitable lubricant reservoir 20 from which a pump 21 forces lubricating medium 22 under suitable pressure as determined by relief valve 23 into the supply line 24. Thus, if the valve member 17 is displaced slightly in an axial direction, either to right or left, fluid will flow from line 24 either through lines 27 or 28 to one side of the hydraulic motor M, the displaced fluid returning by way of line 34' to the reservoir 22.

In the embodiment of the invention particularly illustrated two balancing regions are provided in the bearing as at 25 and 26. The pressure line is therefore preferably provided with branches 27 and 28 communicating respectively with the pressure supply grooves 29 and 30, longitudinally or axially spaced with respect to the bearing as an entirety.

It will be noted that for convenience in construction the member 16 is preferably separate from the general support 15 facilitating the formation of the various pressure grooves and ports hereinafter referred to which are illustrated in elevation in Figure 2 and in use are exteriorly sealed by interfitting engagement with member 15.

It will be noted by reference to Figure 1 that the cylindrical portions 31 and 32 on the member 17 and the general pressure and exhaust connections are identical at both points. Corresponding reference characters have, therefore, been utilized to denote corresponding elements in these areas. The portion 31 as illustrated is in overlapping relation to the pressure groove and ports 29 forming substantially a seal therefor except as to the slight difference in diameters of the parts providing a running clearance and permitting a seepage or highly resisted flow longitudinally of the member 31 from groove 29' to collection groove 33 aligning with reservoir connection 34, this flow maintaining a general film of oil circumferentially of the members 17 in intervening relation to its support 16.

The spindle 17 is provided intermediate the length of the portion 31 with a plurality of arcuately extending narrow recesses 35 and subsequent thereto in direction of flow from the pressure groove 29' with the larger pressure areas or chambers 36 adjacent the collecting groove 33.

It will be noted by reference to Figure 2 that the recesses 35 are disposed in the same transverse plane as the radially extending ports or apertures 37 in the support element 16, which port elements extend outward to the periphery of 16. Similarly, the pockets 36 are in the same transverse plane as the ports or passages 38 which likewise extend outward to the periphery of the supporting element 16, as particularly illustrated in Figure 3.

The member 16 has formed on the periphery suitable V or other grooves 39 extending in a helical manner about the periphery and with a lead which is double the axial spacing of the ports 37 and 38. As a result, the groove in 180 degree turn will advance from port 37 of recess 35 at one side of spindle 17 to the port 38 of pocket or chamber 36 on the diametrically opposite side of spindle 17. Inasmuch as the member 15 forms a seal for the outer face of the grooves there is thus provided a completely closed lubricant tight conduit extending from a narrow collecting recess 35 on one side of the spindle to a wide collecting pocket or pressure area 36 on the opposite side of the spindle so that in the event of any pressure differentials existing in the several recesses 35 there will be corresponding opposed differentials in the areas or chambers 36.

It will be understood that in the normal operation of a bearing structure such as described that there will be a substantially equalized pressure created by pump 21 about the entire system of pressure areas 36. In the event, however, of any displacing force against the spindle bearings 17 or 11, tending to cant or radially displace either of the spindle elements such movement will tend to slightly increase the spacing between the spindle and member 16 at the side on which this force is being applied and urge the diametrically opposite faces of the parts together. Any such tendency will, of course, decrease the resistance to flow of lubricant under pressure from groove 29' to the recess 35 on the side where such force is being applied.

This decrease in resistance will cause a pressure rise in recess 35 which will be transmitted by way of connecting groove 39 to the opposite pressure area 36 which it will be noted is appreciably greater than the recess 35. At the same time the shaft movement will tend to close off the flow from this pressure area 36 to the adjacent collecting groove 33, thus augmenting the rise of pressure in the area 36. Simultaneously, the shaft movement will tend to close off the flow into the opposed recess 35, increasing the resistance to entrance of oil, and concomitantly decreasing the resistance to discharge of the lubricating fluid from its coupled pocket 36 longitudinally of the bearing to the reservoir or collecting groove 33.

There will thus be created an automatic balancing or centering action in which there will be a reduction of pressure urge of the spindle in the direction of applied force due to increase of resistance to flow into the pressure pocket at the side of the spindle from which the force is applied, and at the same time decrease of resistance to discharge from this pocket into the collecting groove. At the same time, as pointed out, there will be a decrease of resistance to flow of the pressure lubricant into recess 35 on the side of the applied force and an increased resistance to discharge from its coupled pressure pocket 36 with a consequent building up of pressure in opposition to the applied forces. This building up of pressure will tend to recentralize the spindle 17, thus preventing metal to metal contact. As has been mentioned, the structure just referred to is preferably provided in duplicate at spaced points along the supported shaft or spindle so that a joint steadying action is provided, preventing canting or relative twisting of the parts as well as direct radial movement.

The structural elements of Figures 5 and 6 correspond in effect and are identical in operation with the form just described. The principal distinction in this form of the invention is that the oil under pressure is supplied as before through a suitable pressure groove 40 in the supporting element 16 and passes by way of groove 41 in the element 17 circumferentially of the bearing portion 42 having the lubricant receiving recesses 350 and the pressure pockets 360. In this form of the invention, however, the cross connection effect is produced by diagonal drilling ports or passages 390 in the member 17 itself in place of employing the outer circumferential grooves 39 of Figure 2 for interconnecting diametrically opposite lubricant receiving recesses and pressure areas. A reservoir return action in this form takes place as at 43. The exact relationship of the interdrilled connecting areas shown in dotted lines in Figure 5 is further brought out by the sectional view, Figure 6, which clearly indicates the interfitting bearing areas of the elements 16 and 17 and the axially advancing portings or passages 390 connecting the diametrically opposed lubricant collecting and displacement resisting pressure areas which function in a manner identical to that hitherto described in connection with Figures 1 and 2.

Thus, it will be noted that there has been provided an improved bearing structure which will insure adequate opposition to relative radial displacement of supported and supporting members and in which there are provided in the members opposed lubricant receiving and pressure applying recesses and pockets of differential areas, interconnected and so disposed that application of an outside force tending to shift one of the members with respect to the other causes a decrease in resistance to flow of the lubricating medium to an opposed pressure area and at the same time increases the resistance to discharge of lubricating medium from that area so that an opposing pressure is quickly built up in the pressure area. The amount of movement necessary to establish this condition is particularly minimized by the dual reactions of decrease of resistance to flow of lubricant under pressure on the force receiving side of the element and concomitant increase in resistance to discharge at the opposite or load resisting area.

From the foregoing it will be apparent that the described arrangement can also be used as the supporting system for rotating shafts or spindles such as the grinding spindle shown in the fragmentary view, Figure 4. Where the principal force acting on the spindle is due to unbalance of the grinding wheel, which constitutes a rotating force vector, the pressure differentials established thereby in the areas 36 will obviously remain constant in spite of the rotation. On the other hand, in applications where the force acting on a rotating spindle is constant in direction with respect to the support, such as provided by an external load, the system of pressure pockets and collecting grooves described in the foregoing should preferably be applied to the stationary member of the bearing structure.

It will further be noted by comparison of Figures 3 and 6, for example, that the interconnections of the respective pressure receiving and pressure utilizing pockets may be suitably formed in different manners. Furthermore, as indicated in the foregoing paragraph, the connections or portings themselves may be contained in either the outer member or the inner member, and it will be understood that in some forms of the invention the pockets may be formed not only entirely in either one member or the other, but partly in one member and partly in the other so long as the necessary interconnections of the several pockets and the desired pressure reactions are effective.

What is claimed is:

1. A bearing structure comprising a pair of telescoping members, one member having a bore providing an internal bearing face and the other member being cylindrical and having an outer bearing face slightly smaller in diameter to allow for a clearance space and relative movement between said bearing faces, one of said members having circumferentially spaced receiving recesses in its bearing face, one of said members having circumferentially spaced balancing pockets in its bearing face axially offset relative to said recesses, means interconnecting individual circumferentially spaced pockets and recesses, means forming a source of lubricant under pressure, and means for coupling the lubricant under pressure to said clearance space at a point adjacent said recesses and remote from said pockets whereby radial relative displacement of the members will increase the clearance space adjacent a recess reducing the resistance to flow of lubricant under pressure and simultaneously decrease the clearance adjacent the pocket coupled with said recess increasing resistance to flow therefrom to build up a pressure in said last-mentioned pocket to resist said radial displacement.

2. A bearing structure comprising a pair of telescoping members, one member having a bore providing an internal bearing face and the other member being cylindrical and having an outer bearing face slightly smaller in diameter to allow for a clearance space and relative movement between said bearing faces, one of said members having circumferentially spaced receiving recesses in its bearing face, one of said members having circumferentially spaced balancing pockets in its bearing face axially offset relative to said recesses, means interconnecting individual circumferentially spaced pockets and recesses, means forming a source of lubricant under pressure, means for coupling the lubricant under pressure to said clearance space at a point adjacent said recesses and remote from said pockets whereby radial relative displacement of the members will increase the clearance space adjacent a recess reducing the resistance to flow of lubricant under pressure and simultaneously decrease the clearance adjacent the pocket coupled with said recess increasing resistance to flow therefrom to build up a pressure in said last-mentioned pocket to resist said radial displacement, and collecting means communicating with said clearance space to receive the flow of lubricant therefrom, thereby to maintain a lubricant film in said clearance space under varying flow conditions.

3. A structure of the character described, a bearing element including a support having a bore, and a bearing bushing mounted within said bore having a central bearing portion and having a plurality of helically advancing grooves formed in its outer face, each of said grooves terminating at each end in conduit ports circumferentially spaced from each other approximately 180° and extending into the interior of the bushing whereby said several ports are disposed in axially spaced relation as respects the interior of the bushing; and a driven member having a bearing portion journaled within said bushing of slightly less diameter than the bearing portion of the bushing whereby to provide a lubricant film clearance space between said bearing portions, means for injecting lubricant under pressure to said clearance space one of said bearing portions having a series of balancing pockets formed therein in circumferentially spaced relation for registry with the ports at one end of the helical grooves, one of said bearing elements having a plurality of lubricant receiving recesses formed therein in a circumferential series axially positioned intermediate said pockets and said injecting means and in registry with the other series of ports of the helical grooves, whereby any radial displacement of the driven member to decrease the clearance space adjacent one section of said driven element increases the pressure of lubricant in the pocket adjacent said section and decreases the pressure of the lubricant in the diametrically opposite pocket.

4. A bearing structure comprising a bushing member having a bearing surface, a bearing element having a bearing surface and mounted within said bushing member, one of said bearing surfaces having a portion cut away to provide a recess for receiving a fluid under pressure and one of said bearing surfaces having a portion cut away to provide a balancing pocket, said recess and said pocket being circumferentially spaced approximately 180°, means for injecting fluid under pressure between said bearing surfaces to flow to said recess, a conduit extending from the recess to the pocket for conducting fluid from the recess to the pocket, substantially as and for the purpose described.

5. In a construction of the character described, the combination of a pair of interfitting relatively movable members having coacting bearing surfaces with a clearance space therebetween, means for introducing liquid under pressure at a point in said clearance space, one of said members having an opening in its bearing surface spaced from said point so that liquid may flow through said clearance space to said opening whereby non-axial lateral relative movement of said members varies the space and thereby the resistance to flow therethrough, there being a pocket formed in the bearing surface of said last-mentioned member on the far side thereof from said opening, and communicating means other than said clearance space and independent of said liquid-introducing means and connecting said opening with said pocket whereby liquid may flow from said opening to said pocket.

6. In a construction of the character described, the combination of a pair of interfitting relatively movable members having coacting bearing surfaces with a clearance space therebetween, means for introducing liquid under pressure at a point in said clearance space, one of said members having an opening in its bearing surface spaced from said point so that liquid may flow through said clearance space to said opening whereby non-axial lateral relative movement of said members varies the space and thereby the resistance to flow therethrough, there being a pocket formed in the bearing surface of said last-mentioned member opening into the clearance space on the far side thereof from said opening and having a larger pressure area than said opening, and communicating means other than said clearance space and independent of said liquid-introducing means and connecting said opening with said pocket whereby liquid may flow from said opening to said pocket.

7. In a construction of the character described, the combination of a pair of interfitting relatively movable members having coacting bearing surfaces with a clearance space therebetween, means for introducing liquid under pressure at one section in said clearance space, one of said members having a plurality of openings formed in its bearing surface and spaced from said section, said openings being spaced in directions surrounding the axis of said members, whereby liquid may flow through said space to said openings and non-axial lateral relative movement of said members varies the resistance to said flow, there being a plurality of pockets formed in the bearing surface of one of said members, said pockets being spaced in directions surrounding the axis of said last-mentioned member, said openings and pockets being divided into pairs on the same member each comprising one opening and a pocket on the far side of said last-mentioned member from the opening, and means individually connecting said pairs of openings and pockets whereby liquid may flow therebetween.

8. In a construction of the character described, the combination of a pair of interfitting relatively movable members having coacting bearing surfaces with a clearance space therebetween, means for introducing liquid under pressure at one point in said clearance space, one of said members having a plurality of openings formed in its bearing surface and spaced from said point, said openings being spaced in directions surrounding the axis of said members, whereby liquid may flow through said space to said openings and non-axial lateral relative movement of said members varies the resistance to said flow, there being a plurality of pockets formed in the bearing surface of one of said members, said pockets being spaced in directions surrounding the axis of said last-mentioned member, the area of said pockets being substantially greater than the area of said openings, said openings and pockets being divided into pairs on the same member each comprising one opening and a pocket on the far side of said last-mentioned member from the openings, and means individually connecting said pairs of openings and pockets whereby liquid may flow therebetween.

9. In a construction of the character described the combination of a pair of interfitting relatively movable members having coacting bearing surfaces with a clearance space therebetween, means for introducing liquid under pressure at one point in said clearance space, one of said members having a plurality of openings formed in its bearing surface and spaced from said point, said openings being spaced in directions surrounding the axis of said members, whereby liquid may flow through said space to said openings and non-axial lateral relative movement of said members varies the resistance to said flow, there being a plurality of pockets formed in the bearing surface of one of said members and axially spaced from said openings, said pockets being spaced in directions surrounding the axis of said last-mentioned member, said openings and pockets being divided into pairs on the same member each comprising one opening and a pocket on the far side of said last-mentioned member from the opening, and means individually connecting said pairs of openings and pockets whereby liquid may flow therebetween.

10. In a construction of the character described, the combination of a pair of interfitting relatively movable members having coacting bearing surfaces with a clearance space therebetween, means for introducing liquid under pressure at one point in said clearance space, means forming a drainage for said liquid from said clearance space at a point axially spaced from said last-mentioned point, one of said members having a plurality of openings formed in its bearing surface and spaced between said points, said openings being spaced in directions surrounding the axis of said member whereby liquid may flow through said space to said openings and non-axial lateral relative movement of said members varies the resistance to said flow, there being a plurality of pockets formed in the bearing surface of one of said members between said points and axially spaced from said openings, said pockets being spaced in directions surrounding the axis of said last-mentioned member, said openings and pockets being divided into pairs on the same member each comprising one opening and a pocket on the far side of said last-mentioned member from the opening, and means individually connecting said pairs of openings and pockets whereby liquid may flow therebetween.

11. In a construction of the character described, the combination of a pair of interfitting relatively movable members having coacting bearing surfaces with a clearance space therebetween, means for introducing liquid under pressure at one point in said clearance space, means forming a drainage for said liquid from said clearance space at a point axially spaced from said last-mentioned point, one of said members having a plurality of openings formed in its bearing surface and spaced between said points, said openings being spaced in directions surrounding the axis of said member whereby liquid may flow through said space to said openings and non-axial lateral relative movement of said members varies the resistance to said flow, there being a plurality of pockets formed in the bearing surface of one of said members and axially spaced from said openings and said drainage means, said pockets being spaced in directions surrounding the axis of said last-mentioned member, said openings and pockets being divided into pairs on the same member each comprising one opening and a pocket on the far side of said last-mentioned member from the opening, and means individually connecting said pairs of openings and pockets whereby liquid may flow therebetween.

12. In a construction of the character described, the combination of a cylindrical bearing member, a journal member telescopically mounted in said bearing member for axial movement with respect thereto, there being a clearance space between said members, means for introducing liquid under pressure at one point in said clearance space, one of said members having an opening in its bearing surface spaced from said point so that liquid may flow through said clearance space to said opening whereby radial relative movement of said members varies the space and thereby the resistance to flow therethrough, there being a pocket formed in the bearing surface of one of said members substantially diametrically opposite to said opening, and communicating means other than said clearance space and independent of said liquid-introducing means and connecting said opening and said pocket whereby liquid may flow from said opening to said pocket.

13. In a construction of the character described, the combination of a cylindrical bearing member, a journal member telescopically mounted in said bearing member for axial movement with respect thereto, there being a clearance space between said members, means for introducing liquid under pressure at one point in said clearance space, one of said members having an opening in its bearing surface spaced from said point so that liquid may flow through said clearance space to said opeing whereby radial relative movement of said members varies the space and thereby the resistance to flow therethrough, there being a pocket formed in the bearing surface of one of said members substantially diametrically opposite to said opening, the area of said pocket being substantially greater than the area of said opening, and communicating means other than said clearance space and independent of said liquid-introducing means and connecting said opening and said pocket whereby liquid may flow from said opening to said pocket.

14. A device comprising relatively bodily movable members spaced from each other and having spaced opposed surface portions forming different sized pressure areas on opposite sides of one of said members, one of said members being provided with means for conducting fluid under pressure to the smaller area, one of said members being provided with additional means independent of said first mentioned means for conducting fluid from said last mentioned area to the larger area, and one of said members being provided with outlet means for conducting fluid from the larger area, the spacing between said opposed surface portions being automatically varied by relative bodily movement of said members to regulate the pressure of fluid between said opposed surface portions.

15. A device comprising relatively bodily movable members spaced from each other and having spaced opposed surface portions forming different sized pressure areas on opposite sides of one of said members, one of said members being provided with means for conducting fluid under pressure to the smaller area, one of said members being provided with additional means independent of and spaced from said first mentioned means for conducting fluid from said last mentioned area to the larger area, and one of said members being provided with outlet means spaced from said second mentioned means for conducting fluid from the larger area, the spacing between said opposed surface portions being automatically varied by relative bodily movement of said members to regulate the pressure of fluid between said opposed surface portions.

16. In a construction of the character described, the combination of a pair of interfitting relatively movable members having coacting bearing surfaces with a clearance space therebetween, means for introducing liquid under pressure at a point in said clearance space, one of said members having an opening in its bearing surface spaced from said point so that liquid may flow through said clearance space to said opening whereby nonaxial lateral relative movement of said members varies the space and thereby the resistance to flow therethrough, there being a pocket formed in the bearing surface of said last-mentioned member opening into the clearance space on the far side thereof from said opening and having a larger pressure area than said opening, drainage means opening into said clearance space at a point spaced from said pocket, and communicating means other than said clearance space and independent of said liquid-introducing means and connecting said opening with said pocket whereby liquid may flow from said opening to said pocket.

17. In a construction of the character described, the combination of a bearing member, a movable member fitting within and supported by said bearing member with clearance between said members, and means for introducing fluid under pressure at a point in said clearance, one of said members having an opening in its bearing surface spaced from said point so that fluid may flow through said clearance to said opening whereby nonaxial lateral relative movement of said members varies the clearance and thereby the resistance to flow therethrough, there being a pocket formed in the bearing surface of said last-mentioned member on the far side thereof from said opening, said bearing member having a passage formed therein spaced from said clearance and independent of said fluid introducing means and connecting said opening with said pocket whereby liquid may flow from said opening to said pocket.

18. In a construction of the character described, the combination of a bushing element, a bushing member fitting within said bushing element, a movable member fitting within said bushing member with clearance therebetween, and means for introducing fluid under pressure at a point in said clearance, one of said members having an opening in its bearing surface spaced from said point so that fluid may flow through said clearance to said opening whereby nonaxial lateral relative movement of said members varies the clearance and thereby the resistance to flow therethrough, there being a pocket formed in the bearing surface of said last-mentioned member on the far side thereof from said opening, said bushing member having passages formed therein connecting said opening and said pocket with the outer periphery of said bushing member and said bushing member having a groove formed in its periphery connecting said passages, said bushing element forming a closure for said groove whereby fluid may flow through the groove from the opening to the pocket.

19. In a construction of the character described, the combination of a bearing member, a slidable member interfitting with said bearing member with clearance therebetween, means for introducing liquid under pressure at a plurality of spaced points to said clearance space, one of said members having a plurality of longitudinally spaced openings in its bearing surface spaced from said points so that liquid may flow through said clearance to said openings, whereby lateral relative movement of said members varies the clearance and thereby the resistance to flow therethrough, there being a series of longitudinally spaced pockets formed in the bearing surface of said last-mentioned member on the far side thereof from said openings, and a series of separate communicating means other than said clearance space and independent of said liquid-introducing means, each connecting one of said openings with one of said pockets whereby liquid may flow from said openings to said pockets.

20. In a construction of the character described, the combination of a bearing member, a slidable member interfitting with said bearing member with clearance therebetween, means for introducing liquid under pressure at a plurality of spaced points in said clearance, said slidable member having a plurality of longitudinally spaced openings in its bearing surface spaced from said points so that liquid may flow through said clearance to said openings whereby lateral relative movement of said members varies the clearance and thereby the resistance to flow therethrough, there being a plurality of longitudinally spaced pockets formed in the bearing surface of said slidable member on the far side thereof from said openings, said slidable member having formed therein a plurality of passages separated from the clearance and said liquid-introducing means, each passage connecting one of said openings with one of said pockets whereby liquid may flow from said openings to said pockets.

21. In a construction of the character described, the combination of a pair of interfitting relatively movable members having coacting bearing surfaces with a clearance space therebetween, means for introducing liquid under pressure at one point in said clearance space, one of said members having a plurality of openings formed in its bearing surface and spaced from said point, said openings being spaced in directions surrounding the axis of said members, whereby liquid may flow through said space to said openings and nonaxial lateral relative movement of said members varies the resistance to said flow, there being a plurality of pockets formed in the bearing surface of one of said members, said pockets being spaced in directions surrounding the axis of said last-mentioned member, said openings and pockets being divided into pairs on the same member each comprising one opening and a pocket on the far side of said last-mentioned member from the opening, and means individually connecting said pairs of openings and pockets whereby liquid may flow therebetween.

22. In a construction of the character described, a bearing member having a cylindrically-shaped bearing surface, a member journaled in said bearing member, there being a clearance space between said members, means for introducing liquid under pressure at a point in said clearance space, one of said members having an opening in its bearing surface spaced from said point so that liquid may flow through said clearance space to said opening whereby non-axial lateral relative movement of said members varies the space and thereby resistance to flow therethrough, there being a pocket formed in the bearing surface of said last mentioned member diametrically opposite to said opening, said pocket having a larger pressure area than said opening, communicating means other than said clearance space and independent of said liquid introducing means for connecting said opening and said pocket whereby liquid may flow from said opening to said pocket, and drainage means for liquid flowing from said clearance space, said pocket being axially spaced from said drainage means so that liquid may flow from said pocket through said clearance space to said drainage means whereby non-axial lateral relative movement of said members varies the space and thereby the resistance to flow therethrough.

23. In a construction of the character described, a bearing member having a cylindrically-shaped bearing surface, a member journaled in said bearing member, there being a clearance space between said members, one of said members having an annular pressure supply groove in its bearing surface, means for introducing liquid under pressure into said groove, one of said members having an opening in its bearing surface spaced from said groove so that liquid may flow thorugh said clearance space to said opening whereby non-axial lateral relative movement of said members varies the space and thereby the resistance to flow therethrough, there being a pocket formed in the bearing surface of said last mentioned member diametrically opposed to said opening, said pocket having a larger pressure area than said opening, and communicating means other than said clearance space and independent of said liquid introducing means for connecting said opening and said pocket whereby liquid may flow from said opening to said pocket, one of said members having an annular drainage groove in its bearing surface of one of said members, said last-mentioned groove being spaced from said pocket so that liquid may flow from said pocket through said clearance space to said drainage groove whereby non-axial lateral relative movement of said members varies the space and thereby the resistance to flow therethrough.

24. In a construction of the character described, a bearing member having a cylindrically-shaped bearing surface, a cylindrically-shaped member mounted on said bearing member, said members having coacting bearing surfaces with a clearance space therebetween, one of said members having an annular pressure supply groove in its bearing surface, means for introducing liquid under pressure into said supply groove, one of said members having a plurality of openings formed in its bearing surface equidistantly spaced from said groove, said openings being spaced from each other in directions surrounding the axis of said member, whereby liquid may flow through said space to said openings and non-axial lateral relative movement of said members varies the resistance to said flow, there being a plurality of pockets formed in the bearing surface of one of said members, said pockets being spaced from each other in directions surrounding the axis of said last-mentioned member and having larger pressure areas than said openings, said openings and pockets being divided into pairs on the same member, each pair comprising one opening and a pocket circumferentially spaced 180° with respect to each other, individual communicating means other than said clearance space and independent of said pressure supply groove for individually connecting each opening to its pocket whereby liquid may flow from each opening to its pocket, and means forming a drainage for liquid flowing from said clearance space at a point axially spaced from said pockets, whereby liquid may flow from said pockets through said clearance space to said last-mentioned means and non-axial lateral relative movement of said members varies the resistance to flow from said pockets.

25. In a construction of the character described, in combination, a bearing member having a cylindrically-shaped bearing surface, a cylindrically-shaped member mounted in said bearing member, said members having coacting bearing surfaces with clearance space therebetween, means for circumferentially introducing liquid under pressure at one section in said clearance space, one of said members having a plurality of openings formed in its bearing surface, said openings being axially spaced equal distances from said section and being of equal area, said openings being spaced equal distances from each other in directions surrounding the axis of said member, whereby liquid may flow through said space to said openings and non-axial lateral relative movement of said members varies the resistance to said flow, there being a plurality of pockets formed in the bearing surface of one of said members, said pockets being axially spaced from said openings, being of equal area, and being equally spaced from each other in directions surrounding the axis of said last-mentioned member, said pockets having larger pressure areas than said openings, said openings and pockets being divided into pairs on the same member, each pair comprising one opening and a pocket circumferentially spaced 180° with respect to each other, individual communicating means other than said clearance space and independent of said pressure supply groove for individually connecting each opening to its pocket whereby liquid may flow from each opening to its pocket, and means forming a drainage for liquid flowing from said clearance space at a point axially spaced from said pockets, whereby liquid may flow from said pockets through said clearance space to said last-mentioned means and non-axial lateral relative movement of said members varies the resistance to flow from said pockets.

26. In a construction of the character described, in combination, a bearing member having a cylindrically-shaped bearing surface, a cylindrically-shaped member mounted in said bearing member, said members having coacting bearing surfaces with clearance space therebetween, one of said members having an annular pressure supply groove in its bearing surface, means for introducing liquid under pressure into said supply groove, one of said members having a plurality of openings formed in its bearing surface, said openings being axially spaced equal distances from said groove and being of equal area, said openings being spaced equal distances from each other in directions surrounding the axis of said member, whereby liquid may flow through said space to said openings and non-axial lateral relative movement of said members varies the resistance to said flow, there being a plurality of pockets formed in the bearing surface of one of said members, said pockets being axially spaced from said openings, being of equal area, being equally spaced from each other in directions surrounding the axis of said last-mentioned member, and having larger pressure areas than said openings, said openings and pockets being divided into pairs on the same member, each pair comprising one opening and a pocket circumferentially spaced 180° with respect to each other, individual communicating means other than said clearance space and independent of said pressure supply groove for individually connecting each opening to its pocket whereby liquid may flow from each opening to its pocket, and one of said members having an annular drainage groove formed in its bearing surface, said last-mentioned groove being spaced from said pockets whereby liquid may flow from said pockets through said clearance space to said drainage groove and non-axial lateral relative movement of said members varies the resistance to flow from said pockets.

MARIO E. MARTELLOTTI.

REFERENCES CITED

The following references are of record in the file of this patent:

UNITED STATES PATENTS

| Number | Name | Date |
|---|---|---|
| 603,260 | Cook | May 3, 1898 |
| 1,906,715 | Penick | May 2, 1933 |
| 2,049,343 | Warren | July 28, 1936 |